(12) United States Patent
Zhao

(10) Patent No.: US 11,877,261 B2
(45) Date of Patent: Jan. 16, 2024

(54) CONFIGURATION PARAMETER UPDATE METHOD AND APPARATUS

(71) Applicant: HUAWEI CLOUD COMPUTING TECHNOLOGIES CO., LTD., Gui'an New District (CN)

(72) Inventor: Can Zhao, Shenzhen (CN)

(73) Assignee: HUAWEI CLOUD COMPUTING TECHNOLOGIES CO., LTD., Gui'an New District (CN)

(*) Notice: Subject to any disclaimer, the term of this patent is extended or adjusted under 35 U.S.C. 154(b) by 238 days.

(21) Appl. No.: 17/239,020

(22) Filed: Apr. 23, 2021

(65) Prior Publication Data

US 2021/0243727 A1 Aug. 5, 2021

Related U.S. Application Data

(63) Continuation of application No. PCT/CN2019/103920, filed on Sep. 2, 2019.

(30) Foreign Application Priority Data

Oct. 26, 2018 (CN) .......................... 201811260186.9

(51) Int. Cl.
*H04W 72/02* (2009.01)
*H04W 76/11* (2018.01)
(Continued)

(52) U.S. Cl.
CPC ........... *H04W 72/02* (2013.01); *H04W 24/08* (2013.01); *H04W 28/0284* (2013.01);
(Continued)

(58) Field of Classification Search
None
See application file for complete search history.

(56) References Cited

U.S. PATENT DOCUMENTS

2003/0002642 A1* 1/2003 Jorasch ............... H04M 1/2757
379/32.01
2013/0072222 A1* 3/2013 Weill .................... H04W 64/00
455/456.1
(Continued)

FOREIGN PATENT DOCUMENTS

CN 105246025 A 1/2016
CN 105338639 A 2/2016
(Continued)

OTHER PUBLICATIONS

S2-181087 LG Electronics, "Clarification on PC5 parameters from V2X Application Server", 3GPP TSG-SA WG2 Meeting #125, Gothenburg, Sweden, Jan. 22-26, 2018, total 5 pages.
(Continued)

*Primary Examiner* — Andre Tacdiran
(74) *Attorney, Agent, or Firm* — HAUPTMAN HAM, LLP

(57) ABSTRACT

In a configuration parameter update method, a first device requests a second device to monitor a target event, where the target event includes one or more of a service change event, a service volume impact event, and a service volume change event. The first device receives first information of the target event from the second device, where the first information includes one or more of service change information, service volume impact information, and service volume change information. The first device updates a PC5 configuration parameter based on the first information. Based on the method, the first device can receive the first information in time, and further update the PC5 configuration parameter in time.

20 Claims, 7 Drawing Sheets

(51) Int. Cl.
*H04W 24/08* (2009.01)
*H04W 28/02* (2009.01)
*H04W 72/52* (2023.01)
*H04W 92/18* (2009.01)
*H04L 41/0816* (2022.01)

(52) U.S. Cl.
CPC ............ *H04W 72/52* (2023.01); *H04W 76/11* (2018.02); *H04L 41/0816* (2013.01); *H04W 92/18* (2013.01)

(56) References Cited

U.S. PATENT DOCUMENTS

| | | | | |
|---|---|---|---|---|
| 2015/0245193 | A1* | 8/2015 | Xiong | H04W 8/005 370/328 |
| 2018/0234973 | A1 | 8/2018 | Lee et al. | |
| 2019/0215685 | A1* | 7/2019 | Wang | H04W 80/08 |
| 2020/0351975 | A1* | 11/2020 | Tseng | H04L 5/0057 |

FOREIGN PATENT DOCUMENTS

| | | |
|---|---|---|
| CN | 105554689 A | 5/2016 |
| CN | 107645774 A | 1/2018 |
| CN | 107666647 A | 2/2018 |
| CN | 108307472 A | 7/2018 |
| CN | 108541017 A | 9/2018 |
| CN | 108616852 A | 10/2018 |
| WO | 2017030348 A1 | 2/2017 |
| WO | 2017052335 A1 | 3/2017 |
| WO | WO2017051222 * | 5/2017 |
| WO | 2017113207 A1 | 7/2017 |
| WO | 2017133769 A1 | 8/2017 |
| WO | 2018028279 A1 | 2/2018 |
| WO | 2018157611 A1 | 9/2018 |
| WO | WO2019029144 * | 2/2019 |

OTHER PUBLICATIONS

3GPP TR 23.795 V16.0.0 (Sep. 2018); 3rd Generation Partnership Project; Technical Specification Group Services and System Aspects; Study on application layer support for V2X services; (Release 16), Total 77 Pages.

3GPP TS 24.385 V15.1.0 (Sep. 2018); 3rd Generation Partnership Project; Technical Specification Group Core Network and Terminals; V2X services Management Object (MO) (Release 15), Total 85 Pages.

3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages.

Chinese Office Action issued in corresponding Chinese Application No. 201811260186.9, dated Sep. 1, 2020, pp. 1-6.

Extended European Search Report issued in corresponding European Application No. 19874991.3, dated Sep. 21, 2021, pp. 1-10.

International Search Report issued in corresponding International Application No. PCT/CN2019/103920, dated Nov. 28, 2019, pp. 1-9.

* cited by examiner

CONFIGURATION PARAMETER UPDATE METHOD AND APPARATUS

CROSS-REFERENCE TO RELATED APPLICATIONS

This application is a continuation of International Application No. PCT/CN2019/103920, filed on Sep. 2, 2019, which claims priority to Chinese Patent Application No. 201811260186.9, filed on Oct. 26, 2018. The disclosures of the aforementioned applications are hereby incorporated by reference in their entireties.

TECHNICAL FIELD

This application relates to the field of communications technologies, and in particular, to a configuration parameter update method and apparatus.

BACKGROUND

A vehicle-to-everything (V2X) is a key technology of an intelligent transportation system. The V2X includes vehicle to vehicle (V2V), vehicle to infrastructure (V2I), vehicle to network (V2N), and vehicle to pedestrian (V2P). A series of traffic information such as a real-time road condition, road information, and pedestrian information may be obtained through communication between V2Xs, to improve road safety and traffic efficiency, and provide rich streaming media services for a user.

Generally, the V2Xs communicate with each other through a proximity communication five (PC5) interface. For example, in a V2V scenario, vehicles communicate with each other through the PC5. The PC5 communication supports two communication modes: a mode 3 and a mode 4. The mode 3 is a base station scheduling mode. A base station schedules a PC5 communication resource, and allocates the PC5 communication resource to a terminal device. The mode 4 is an autonomous selection mode. A resource pool is pre-configured for a terminal device, and the terminal device obtains a PC5 communication resource from a PC5 communication resource pool by using a competitive mechanism. In the mode 4, PC5 communication resource pools are divided in different regions, in other words, users in a same region share a same PC5 communication resource pool, and each PC5 communication resource pool corresponds to a region identifier.

In an actual application, a PC5 configuration parameter needs to be configured for the base station in the mode 3 and the terminal device in the mode 4. The PC5 configuration parameter includes a PC5 communication resource pool, a resource selection policy, and the like. In the mode 3, the base station may allocate the PC5 communication resource to the terminal device based on the configured PC5 configuration parameter. In the mode 4, the terminal device may compete for the PC5 communication resource based on the configured PC5 configuration parameter.

In the prior art, a vehicle-to-everything application server (V2X AS) usually generates the PC5 configuration parameter, and then delivers the PC5 configuration parameter to the base station or the terminal device for configuration. To ensure quality of communication between terminal devices in the V2X, the V2X AS needs to update the PC5 configuration parameter in time, to adjust the PC5 communication resource pool. However, it is found in practice that currently, the V2X AS cannot update the PC5 configuration parameter in time. Therefore, how to update the PC5 configuration parameter in time is an urgent problem to be resolved at present.

SUMMARY

Embodiments of this application provide a configuration parameter update method and apparatus, to help update a PC5 configuration parameter in time.

According to a first aspect, at least one embodiment of this application provides a configuration parameter update method. The method includes: sending, by a first device, a first monitoring request to a second device, where the first monitoring request is used to request the second device to monitor a target event, the target event includes one or more of a service change event, a service volume impact event, and a service volume change event, the service volume change event is an event in which a service volume is greater than a first threshold or a service volume is less than a second threshold, and the first threshold is greater than the second threshold; receiving, by the first device, first information that is of the target event and that is reported by the second device, where the first information includes one or more of service change information, service volume impact information, and service volume change information; and updating, by the first device, a PC5 configuration parameter based on the first information. Based on the method described in the first aspect, the first device can receive the first information in time, and further update the PC5 configuration parameter in time based on the first information.

In an optional implementation, the first information includes the service change information, the service change information includes a changed service and an identifier of a first area, and the first area is an area in which the changed service is used. Correspondingly, a specific implementation of the updating, by the first device, a PC5 configuration parameter based on the first information includes: determining, based on the changed service, a target service used in the first area; determining a quantity of terminals that have the target service; determining, based on the target service and the quantity of terminals, a PC5 communication resource required in the first area; and updating, based on the PC5 communication resource required in the first area, a PC5 communication resource pool that corresponds to the first area and that is in the PC5 configuration parameter. Based on this implementation, the first device can accurately determine the PC5 communication resource required in the first area, and the first device can properly update the PC5 configuration parameter in time based on the PC5 communication resource required in the first area.

As an optional implementation, the service change information further includes an identifier of a terminal of the changed service. A specific implementation of the determining a quantity of terminals that have the target service includes: determining, based on the identifier of the terminal of the changed service, the quantity of terminals that have the target service Based on this implementation, the first device can accurately determine the quantity of terminals that have the target service.

In an optional implementation, the first information includes the service volume impact information, the service volume impact information includes a monitored service volume impact event and an identifier of a first area, and the first area is an area affected by the service volume impact event. A specific implementation of the updating, by the first device, a PC5 configuration parameter based on the first information includes: determining, based on the monitored service volume impact event, a PC5 communication resource required in the first area; and updating, based on the PC5 communication resource required in the first area, a PC5 communication resource pool that corresponds to the first area and that is in the PC5 configuration parameter. Based on this implementation, the first device can accurately determine the PC5 communication resource required in the first area, and the first device can properly update the PC5 configuration parameter in time based on the PC5 communication resource required in the first area.

As an optional implementation, the service volume impact information further includes a first time period, and the first time period is a time period the service volume impact event lasts. After the updating, based on the PC5 communication resource required in the first area, a PC5 communication resource pool that corresponds to the first area and that is in the PC5 configuration parameter, the first device restores, based on the first time period, the PC5 communication resource pool corresponding to the first area to a resource pool used before the updating. Based on this implementation, the first device can properly restore the PC5 configuration parameter in time.

In an optional implementation, the first information includes the service volume change information, the service volume change information includes a changed service volume and an identifier of a first area, and the first area is an area in which a service volume is changed. Correspondingly, a specific implementation of the updating, by the first device, a PC5 configuration parameter based on the first information includes: determining, based on the first information, a PC5 communication resource required in the first area; and updating, based on the PC5 communication resource required in the first area, a PC5 communication resource pool that corresponds to the first area and that is in the PC5 configuration parameter. Based on this implementation, the first device can accurately determine the PC5 communication resource required in the first area, and the first device can properly update the PC5 configuration parameter in time based on the PC5 communication resource required in the first area.

In an optional implementation, the first information further includes one or more of a type of a target terminal and a size of a message sent by the target terminal through PC5, and the target terminal is a terminal that performs communication in the first area through the PC5. Based on this implementation, the first device can more accurately determine, based on more parameters, the PC5 communication resource required in the first area.

In an optional implementation, the method further includes: sending, by the first device, a second monitoring request to a terminal device, where the second monitoring request is used to request the terminal device to monitor a network congestion event; and receiving, by the first device, second information that is of the network congestion event and that is reported by the terminal device, where the second information includes a network parameter of the terminal device and current location information of the terminal device. A specific implementation of the updating, by the first device, a PC5 configuration parameter based on the first information includes: updating, by the first device, the PC5 configuration parameter based on the first information and the second information. Based on this implementation, the first device can properly update the PC5 configuration parameter in time.

In an optional implementation, the second information further includes a type of terminal device. Different types of terminal devices require different PC5 communication resources. Therefore, the PC5 communication resource required in the area may be determined based on the type of terminal device.

In an optional implementation, the second monitoring request carries one or more of an area that needs to be monitored, a network parameter that needs to be monitored, and a reporting condition of the second information. Based on this implementation, the first device can specify, for the terminal device, the area that needs to be monitored, the network parameter that needs to be monitored, and the reporting condition of the second information.

In an optional implementation, the first monitoring request carries one or more of a type of terminal that needs to be monitored, the area that needs to be monitored, the first threshold, the second threshold, a service volume statistics period, and a reporting condition of the first information. Based on this implementation, the first device can specify, for the second device, the type of terminal that needs to be monitored, the area that needs to be monitored, the first threshold, the second threshold, the service volume statistics period, and the reporting condition of the first information.

Optionally, when the target event includes the service change event, the first monitoring request may carry one or more of the type of terminal that needs to be monitored and the area that needs to be monitored. Optionally, when the target event includes the service volume impact event, the first monitoring request may carry the area that needs to be monitored. Optionally, when the target event includes the service volume change event, the first monitoring request may carry one or more of the area that needs to be monitored, the first threshold, the second threshold, the type of terminal that needs to be monitored, the service volume statistics period, and the reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform. Optionally, when the target event includes the service change event, the second device is the terminal device or a home platform of the terminal device. Optionally, when the target event includes the service volume impact event, the second device is a traffic management platform. Optionally, when the target event includes the service volume change event, the second device is a roadside unit or a home platform of a terminal device.

According to a second aspect, at least one embodiment of this application provides a configuration parameter update method. The method includes: receiving, by a second device, a first monitoring request sent by a first device, where the first monitoring request is used to request the second device to monitor a target event, the target event includes one or more of a service change event, a service volume impact event, and a service volume change event, the service volume change event is an event in which a service volume is greater than a first threshold or a service volume is less than a second threshold, and the first threshold is greater than the second threshold; monitoring, by the second device, the target event; and after monitoring the target event, reporting, by the second device, first information of the target event to the first device, where the first information includes one or more of service change information, service volume impact information, and service volume change information.

In an optional implementation, the first information includes the service change information, the service change information includes a changed service and an identifier of a first area, and the first area is an area in which the changed service is used.

As an optional implementation, the service change information further includes an identifier of a terminal of the changed service.

In an optional implementation, the first information includes the service volume impact information, the service volume impact information includes a monitored service volume impact event and an identifier of a first area, and the first area is an area affected by the service volume impact event.

In an optional implementation, the service volume impact information further includes a first time period, and the first time period is a time period the service volume impact event lasts.

In an optional implementation, the first information includes the service volume change information, the service volume change information includes a changed service volume and an identifier of a first area, and the first area is an area in which a service volume is changed.

In an optional implementation, the first information further includes one or more of a type of a target terminal and a size of a message sent by the target terminal through PC5, and the target terminal is a terminal that performs communication in the first area through the PC5.

In an optional implementation, the second device may further perform the following step: receiving, by the second device, a second monitoring request sent by the first device, where the second monitoring request is used to request the second device to monitor a network congestion event; monitoring, by the second device, the network congestion event; and after monitoring the network congestion event, reporting, by the second device, second information of the network congestion event to the first device, where the second information includes a network parameter of the second device and current location information of the second device.

In an optional implementation, the second information further includes a type of terminal device.

In an optional implementation, the second monitoring request carries one or more of an area that needs to be monitored, a network parameter that needs to be monitored, and a reporting condition of the second information.

In an optional implementation, the first monitoring request carries one or more of a type of terminal that needs to be monitored, the area that needs to be monitored, the first threshold, the second threshold, a service volume statistics period, and a reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform.

Based on a same inventive concept, for a problem-resolving principle and beneficial effects of the second device, refer to the first aspect or the possible implementations of the first aspect. Details are not described herein.

According to a third aspect, a configuration parameter update apparatus is provided, applied to a first device. The configuration parameter update apparatus includes: a communications module, configured to send a first monitoring request to a second device, where the first monitoring request is used to request the second device to monitor a target event, the target event includes one or more of a service change event, a service volume impact event and a service volume change event, the service volume change event is an event in which a service volume is greater than a first threshold or a service volume is less than a second threshold, and the first threshold is greater than the second threshold; the communications module, further configured to receive first information that is of the target event and that is reported by the second device, where the first information includes one or more of service change information, service volume impact information, and service volume change information; and a processing module, configured to update a PC5 configuration parameter based on the first information.

In an optional implementation, the first information includes the service change information, the service change information includes a changed service and an identifier of a first area, and the first area is an area in which the changed service is used. A manner in which the processing module updates the PC5 configuration parameter based on the first information specifically includes: determining, based on the changed service, a target service used in the first area; determining a quantity of terminals that have the target service; determining, based on the target service and the quantity of terminals, a proximity communication PC5 communication resource required in the first area; and updating, based on the PC5 communication resource required in the first area, a PC5 communication resource pool that corresponds to the first area and that is in the PC5 configuration parameter.

As an optional implementation, the service change information further includes an identifier of a terminal of the changed service. A manner in which the processing module determines the quantity of terminals that have the target service specifically includes: determining, based on the identifier of the terminal of the changed service, the quantity of terminals that have the target service.

In an optional implementation, the first information includes the service volume impact information, the service volume impact information includes a monitored service volume impact event and an identifier of a first area, and the first area is an area affected by the service volume impact event. A manner in which the processing module updates the PC5 configuration parameter based on the first information specifically includes: determining, based on the monitored service volume impact event, a proximity communication PC5 communication resource required in the first area; and updating, based on the PC5 communication resource required in the first area, a PC5 communication resource pool that corresponds to the first area and that is in the PC5 configuration parameter.

As an optional implementation, the service volume impact information further includes a first time period, and the first time period is a time period the service volume impact event lasts. The processing module is further configured to: after updating, based on the PC5 communication resource required in the first area, the PC5 communication resource pool that corresponds to the first area and that is in the PC5 configuration parameter, restore, based on the first time period, the PC5 communication resource pool that corresponds to the first area to a resource pool used before the updating.

In an optional implementation, the first information includes the service volume change information, the service volume change information includes a changed service volume and an identifier of a first area, and the first area is an area in which a service volume is changed. A manner in which the processing module updates the PC5 configuration parameter based on the first information specifically includes: determining, based on the first information, a proximity communication PC5 communication resource required in the first area; and updating, based on the PC5 communication resource required in the first area, a PC5 communication resource pool that corresponds to the first area and that is in the PC5 configuration parameter.

In an optional implementation, the first information further includes one or more of a type of a target terminal and a size of a message sent by the target terminal through PC5, and the target terminal is a terminal that performs communication in the first area through the PC5.

In an optional implementation, the first device sends a second monitoring request to a terminal device, where the second monitoring request is used to request the terminal device to monitor a network congestion event. The first device receives second information that is of the network congestion event and that is reported by the terminal device, where the second information includes a network parameter of the terminal device and current location information of the terminal device. A manner in which the processing module updates the PC5 configuration parameter based on the first information specifically includes: updating, by the first device, the PC5 configuration parameter based on the first information and the second information.

In an optional implementation, the second information further includes a type of terminal device.

In an optional implementation, the second monitoring request carries one or more of an area that needs to be monitored, a network parameter that needs to be monitored, and a reporting condition of the second information.

In an optional implementation, the first monitoring request carries one or more of a type of terminal that needs to be monitored, the area that needs to be monitored, the first threshold, the second threshold, a service volume statistics period, and a reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform.

Based on a same inventive concept, for a problem-resolving principle and beneficial effects of the configuration parameter update apparatus, refer to the first aspect or the possible implementations of the first aspect. Details are not described herein.

According to a fourth aspect, a configuration parameter update apparatus is provided, applied to a second device. The configuration parameter update apparatus includes: a communications module, configured to receive a first monitoring request sent by a first device, where the first monitoring request is used to request the second device to monitor a target event, the target event includes one or more of a service change event, a service volume impact event and a service volume change event, the service volume change event is an event in which a service volume is greater than a first threshold or a service volume is less than a second threshold, and the first threshold is greater than the second threshold; and a processing module, configured to monitor the target event, where the communications module is further configured to: after the processing module monitors the target event, report first information of the target event to the first device, where the first information includes one or more of service change information, service volume impact information, or service volume change information.

In an optional implementation, the first information includes the service change information, the service change information includes a changed service and an identifier of a first area, and the first area is an area in which the changed service is used.

As an optional implementation, the service change information further includes an identifier of a terminal of the changed service.

In an optional implementation, the first information includes the service volume impact information, the service volume impact information includes a monitored service volume impact event and an identifier of a first area, and the first area is an area affected by the service volume impact event.

In an optional implementation, the service volume impact information further includes a first time period, and the first time period is a time period the service volume impact event lasts.

In an optional implementation, the first information includes the service volume change information, the service volume change information includes a changed service volume and an identifier of a first area, and the first area is an area in which a service volume is changed.

In an optional implementation, the first information further includes one or more of a type of a target terminal and a size of a message sent by the target terminal through PC5, and the target terminal is a terminal that performs communication in the first area through the PC5.

In an optional implementation, the communications module is further configured to receive a second monitoring request sent by the first device, where the second monitoring request is used to request the second device to monitor a network congestion event. The processing module is further configured to monitor the network congestion event. The communications module is further configured to: after the processing module monitors the network congestion event, report second information of the network congestion event to the first device, where the second information includes a network parameter of the second device and current location information of the second device.

In an optional implementation, the second information further includes a type of terminal device.

In an optional implementation, the second monitoring request carries one or more of an area that needs to be monitored, a network parameter that needs to be monitored, and a reporting condition of the second information.

In an optional implementation, the first monitoring request carries one or more of a type of terminal that needs to be monitored, the area that needs to be monitored, the first threshold, the second threshold, a service volume statistics period, and a reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform.

Based on a same inventive concept, for a problem-resolving principle and beneficial effects of the configuration parameter update apparatus, refer to the first aspect or the possible implementations of the first aspect. Details are not described herein.

According to a fifth aspect, a configuration parameter update apparatus is provided. The configuration parameter update apparatus includes: a processor, a memory, and a communications interface. The processor, the communications interface, and the memory are connected. The communications interface may be a transceiver. The communications interface is configured to implement communication with another network element (for example, a second device). One or more programs are stored in the memory, and the processor invokes the program stored in the memory to implement the solution in the first aspect or the possible implementations of the first aspect. For a problem-resolving implementation and beneficial effects of the configuration parameter update apparatus, refer to the first aspect or the possible implementations of the first aspect. Details are not described herein.

According to a sixth aspect, a configuration parameter update apparatus is provided. The configuration parameter update apparatus includes: a processor, a memory, and a communications interface. The processor, the communications interface, and the memory are connected. The communications interface may be a transceiver. The communications interface is configured to implement communication with another network element (for example, a first device). One or more programs are stored in the memory, and the processor invokes the program stored in the memory to implement the solution in the second aspect or the possible implementations of the second aspect. For a problem-resolving implementation and beneficial effects of the configuration parameter update apparatus, refer to the second aspect or the possible implementations of the second aspect. Details are not described herein.

According to a seventh aspect, a computer program product is provided. When the computer program product runs on a computer, the computer is enabled to perform the method in the first aspect, the second aspect, the possible implementations of the first aspect, or the possible implementations of the second aspect.

According to an eighth aspect, a chip product is provided, to perform the method in the first aspect, the second aspect, the possible implementations of the first aspect, or the possible implementations of the second aspect.

According to a ninth aspect, a non-transitory computer-readable storage medium is provided. The non-transitory computer-readable storage medium stores an instruction, and when the instruction is run on a computer, the computer is enabled to perform the method in the first aspect, the second aspect, the possible implementations of the first aspect, or the possible implementations of the second aspect.

DESCRIPTION OF EMBODIMENTS

The following further describes specific embodiments of this application in detail with reference to accompanying drawings.

In an existing actual application, a vehicle-to-everything application server (V2X AS) usually generates a PC5 configuration parameter, and then delivers the PC5 configuration parameter to a base station or a terminal device for parameter configuration. To ensure quality of communication between terminal devices in a V2X, the V2X AS needs to update the PC5 configuration parameter in time (e.g., in real time), to adjust a PC5 communication resource pool. However, it is found in other approaches that currently, the V2X AS cannot update the PC5 configuration parameter in time. To update the PC5 configuration parameter in time, some embodiments of this application provide a configuration parameter update method and apparatus.

To better understand some embodiments of this application, the following describes a system architecture to which some embodiments of this application are applicable.

Figure 1:
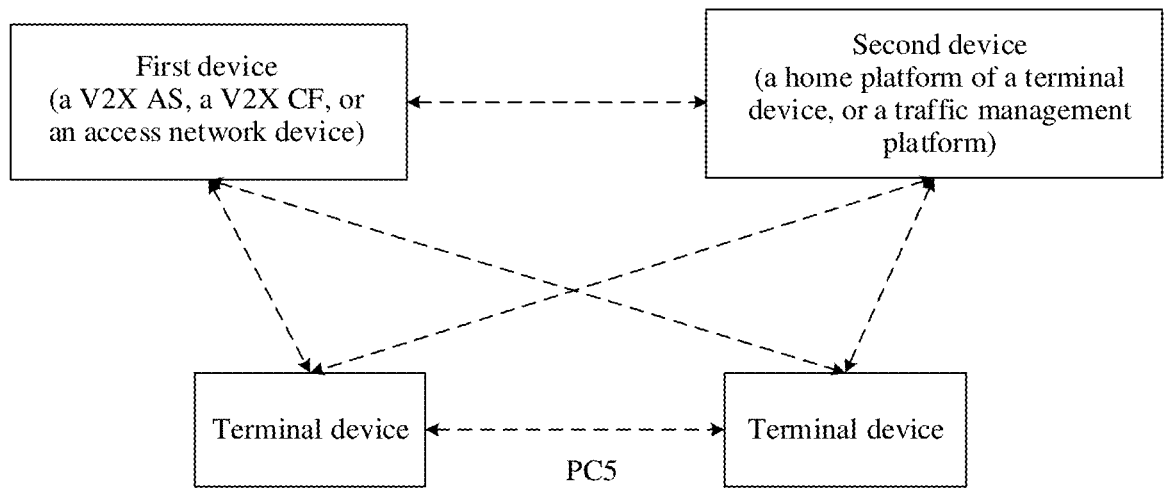
FIG. 1 and FIG. 2 are schematic diagrams of various communications systems according to at least one embodiment of this application.
Figure 2:
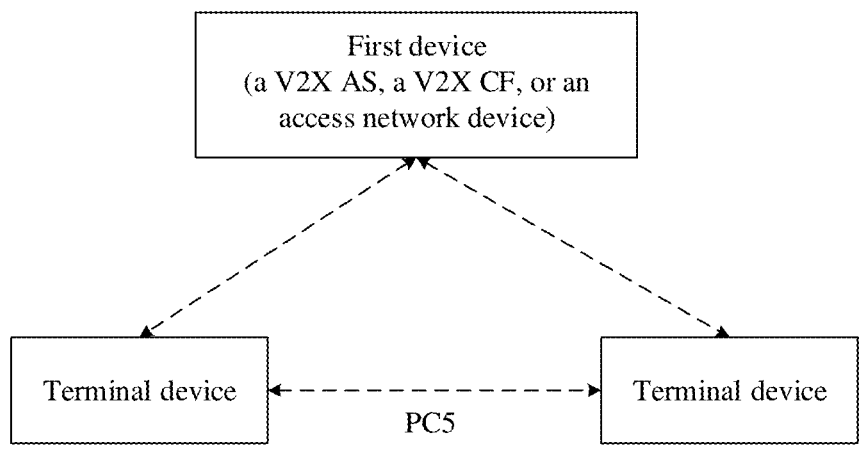

FIG. 1 and FIG. 2 are schematic diagrams of system architectures according to at least one embodiment of this application. A system architecture shown in FIG. 1 includes a first device, a second device, and a plurality of terminal devices (sometimes referred to as "terminals"). Optionally, the first device may be one of a V2X AS, a vehicle-to-everything service control function device (V2X CF), and an access network device. The access network device may be a base station, or another access network device that provides network access to other devices, such as terminal devices. Optionally, the second device may be a home platform or a traffic management platform of the terminal device. Optionally, as shown in FIG. 2, the second device may also be the terminal device. The home platform of the terminal device may be a platform that can register a service for the terminal device and deregister a service for the terminal device, for example, an automotive enterprise platform. The traffic management platform is a platform that can detect a service volume impact event. For example, the service volume impact event may be a traffic control event, a road construction event, or the like. The terminal device may include one or more of a vehicle, a mobile phone, a tablet computer, a roadside unit, and the like. The roadside unit is a roadside device that has a communication capability and that is installed on a roadside. In some embodiments, each of the first device, second device, terminal devices (or terminals), V2X AS, V2X CF, access network device, base station, home platform, traffic management platform, automotive enterprise platform, roadside unit, roadside device, or the like, comprises a processor and a communications interface as described herein.

The first device may update a PC5 configuration parameter. The PC5 configuration parameter includes a PC5 communication resource pool. The PC5 communication resource pool corresponds to an area. The PC5 communication resource pool includes a PC5 communication resource. The PC5 communication resource is used for communication between terminal devices in a V2X through PC5. Optionally, when the first device is the V2X AS or the V2X CF, after the first device updates the PC5 configuration parameter, in other words, after the first device generates a new PC5 configuration parameter, the first device delivers the new PC5 configuration parameter to the access network device or the terminal device to perform configuration update. When the first device is the access network device, the first device may perform a configuration update on a PC5 configuration parameter of the first device. Alternatively, after the first device generates a new PC5 configuration parameter, the first device may deliver the new PC5 configuration parameter to the terminal device to perform a configuration update. As a result, terminals or terminal devices are enabled to perform communication (e.g., V2X communication) with each other over PC5 using the updated PC5 configuration parameter.

The following further describes a configuration parameter update method and a related device that are provided in this application.

Figure 3:
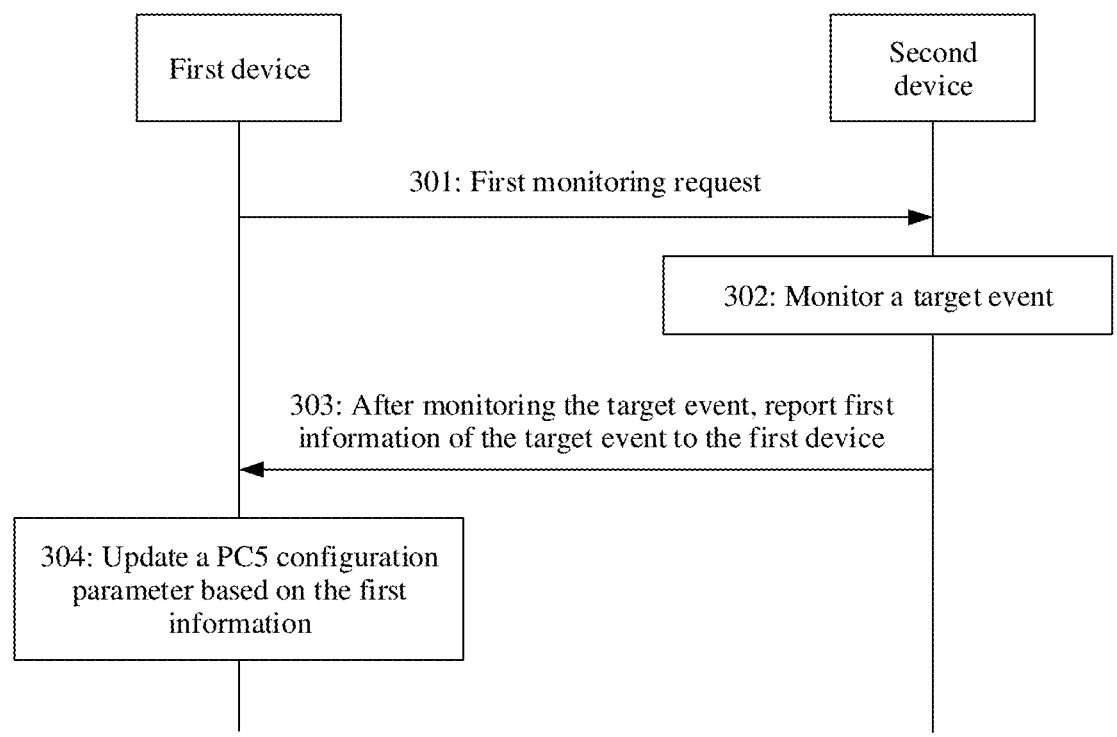
FIG. 3 to FIG. 7 are schematic flowcharts of various configuration parameter update methods according to at least one embodiment of this application.

FIG. 3 is a schematic diagram of a configuration parameter update method according to at least one embodiment of this application. As shown in FIG. 3, the configuration parameter update method includes the following steps 301 to 304.

301: A first device sends a first monitoring request to a second device.

The first monitoring request is used to request the second device to monitor a target event, and the target event includes one or more of a service change event, a service volume impact event, and a service volume change event. As used herein, "monitor," "monitored" and "after monitoring" mean "detect," "detected" and "upon detecting," respectively.

The service change event is an event in which a service of a terminal device is changed. The service change of the terminal device includes service registration and service deregistration of the terminal device. For example, if the terminal device deregisters a warning service or the terminal device adds a map download service, the service change event occurs. Therefore, the service change event may include a service registration event and/or a service deregistration event.

The service volume impact event is an event in which a service volume is affected. The service volume is a quantity of messages that are sent through a PC5 in a unit time. For example, the event in which the service volume is affected may be a traffic control event and/or a road construction event.

The service volume change event is an event in which the service volume is greater than a first threshold or the service volume is less than a second threshold. The first threshold is greater than the second threshold. Therefore, the service volume change event may include a service volume overload event and/or a service volume release event. The service volume overload event is an event in which the service volume is greater than the first threshold, and the service volume release event is an event in which the service volume is less than the second threshold.

Optionally, before the step 301, the first device has performed initial configuration on a PC5 configuration parameter of an access network device in a mode 3 or a terminal device in a mode 4. Steps 301 to 304 are a process of updating the PC5 configuration parameter of the access network device or the terminal device. The mode 3 is a scheduling mode of the access network device. The access network device schedules a PC5 communication resource, and allocates the PC5 communication resource to the terminal device. The mode 4 is an autonomous selection mode. A PC5 communication resource pool is preconfigured for the terminal device, and the terminal device obtains the PC5 communication resource from the PC5 communication resource pool through a competitive mechanism.

302: The second device monitors the target event.

In this embodiment of this application, after receiving the first monitoring request, the second device monitors the target event.

In an optional implementation, the first monitoring request carries one or more of a type of terminal that needs to be monitored, an area that needs to be monitored, the first threshold, the second threshold, a service volume statistics period, and a reporting condition of the first information. If the first monitoring request carries the type of terminal that needs to be monitored, the second device monitors only a terminal device of the type of terminal that needs to be monitored. If the first monitoring request carries the area that needs to be monitored, the second device monitors only the area that needs to be monitored. If the first monitoring request carries a service volume statistics period, the second device collects statistics on a service volume based on the service volume statistics period. If the first monitoring request carries the reporting condition of the first information, after monitoring the target event, the second device reports the first information to the first device only when the reporting condition is met. Based on this implementation, the first device can specify, for the second device, the type of terminal that needs to be monitored, the area that needs to be monitored, the first threshold, the second threshold, the service volume statistics period, and the reporting condition of the first information. Optionally, the type of terminal that needs to be monitored, the area that needs to be monitored, the first threshold, the second threshold, the service volume statistics period, and the reporting condition of the first information may also be preset on the second device, or may be obtained by the second device in another manner. This is not limited in this embodiment of this application.

Optionally, the first monitoring request further carries an identifier of the target event, to indicate the target event that is requested to be monitored. For example, the first monitoring request may carry an identifier of the service registration event and an identifier of the service deregistration event, to request to monitor the service registration event and the service deregistration event. After receiving the first monitoring request, the second device monitors the service registration event and the service deregistration event. Alternatively, the first monitoring request may not carry the identifier of the target event. This is not limited in this embodiment of this application.

303: After monitoring the target event, the second device reports the first information of the target event to the first device.

The first information includes one or more of service change information, service volume impact information, and service volume change information. For example, if the service change event is monitored, the first information includes the service change information. If the service volume impact event is monitored, the first information includes the service volume impact information. If the service volume change event is monitored, the first information includes the service volume change information.

304: The first device updates the PC5 configuration parameter based on the first information.

In this embodiment of this application, after receiving the first information reported by the second device, the first device updates the PC5 configuration parameter based on the first information. Specifically, the first device may determine, based on the first information, a PC5 communication resource required in the area, and further update, based on the PC5 communication resource required in the area, the PC5 communication resource pool that corresponds to the area and that is in the PC5 configuration parameter. Optionally, in addition to updating, based on the PC5 communication resource required in the area, the PC5 communication resource pool that corresponds to the area and that is in the PC5 configuration parameter, the first device may further update a PC5 communication resource pool that corresponds to an adjacent area of the area. For example, the area is an area 2, and an area 1 and an area 3 are adjacent areas of the area 2. When the PC5 communication resource in the area 2 need to be added, if PC5 communication resources in the area 1 and the area 3 are sufficient, a part of the PC5 communication resources in the area 1 and the area 3 may be appropriately reduced, and the reduced PC5 communication resources are added to the PC5 communication resource pool in the area 2. Alternatively, when the PC5 communication resource in the area 2 need to be reduced, if PC5 communication resources in the area 1 and the area 3 are relatively few, the PC5 communication resource in the area 2 may be reduced, the reduced PC5 communication resource is added to PC5 communication resource pools in the area 1 and the area 3. Optionally, updating the PC5 communication resource pool may include adjusting a subframe (subframe) division rule, a quantity of subframes, a quantity of subchannels (subchannel), a start subchannel, or the like, to add or reduce the PC5 communication resource.

When the first device is the V2X AS or the V2X CF, after updating the PC5 configuration parameter based on the first information, the first device delivers a new PC5 configuration parameter to the access network device or the terminal device to perform a configuration update. When the first device is the access network device, the first device may perform a configuration update on a PC5 configuration parameter of the first device based on the first information. Alternatively, after updating the PC5 configuration parameter based on the first information, the first device may deliver a new PC5 configuration parameter to the terminal device to perform configuration update.

It can be learned that according to the method described in FIG. 3, the first device can receive the first information in time, and further update the PC5 configuration parameter in time based on the first information.

Figure 4:
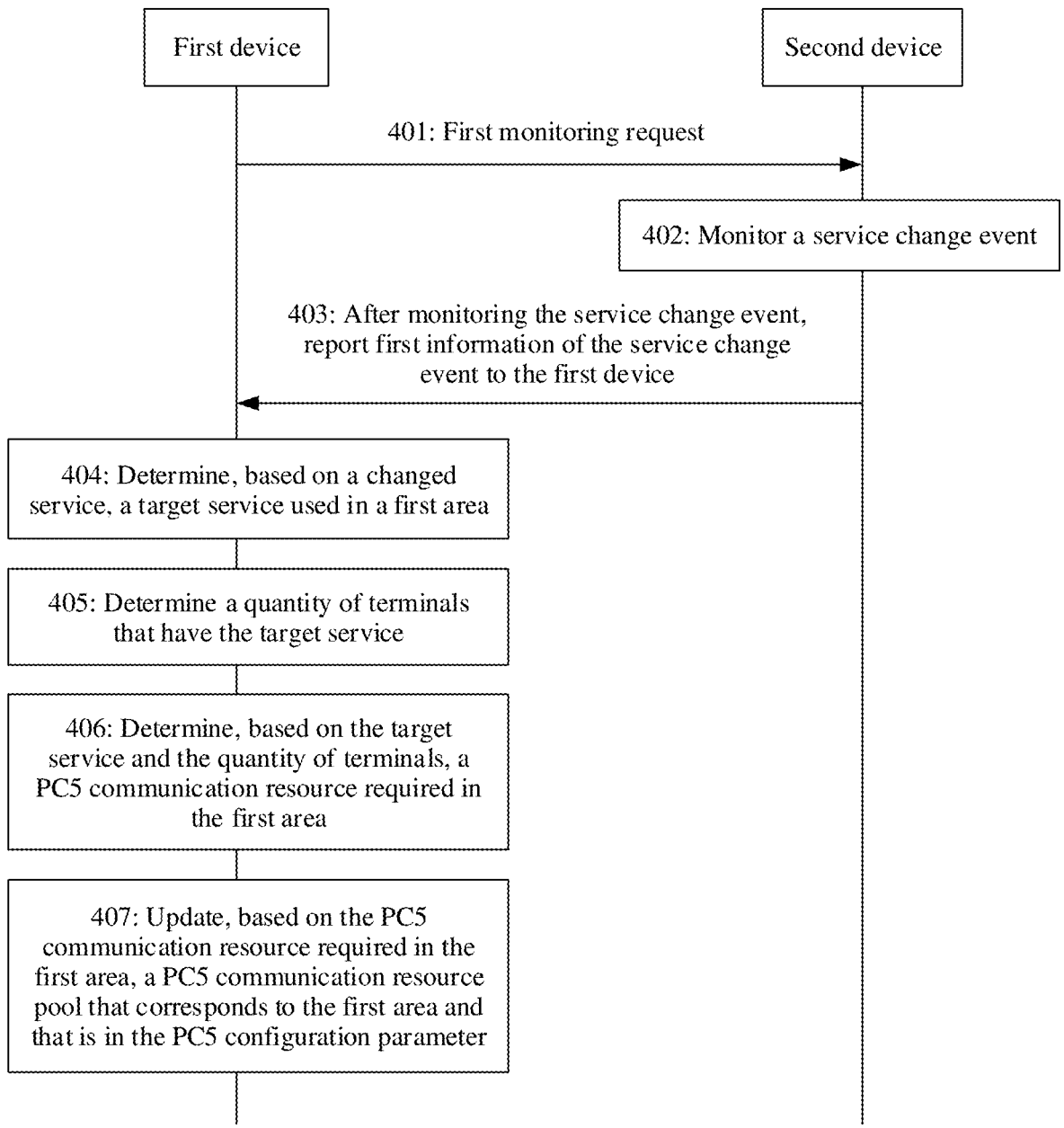

FIG. 4 is a schematic diagram of another configuration parameter update method according to at least one embodiment of this application. FIG. 4 shows an example of monitoring a service change event. In the method shown in FIG. 4, a second device may be a home platform or a terminal device, or another device that can monitor the service change event. As shown in FIG. 4, the configuration parameter update method includes the following steps 401 to 407. The steps 404 to 407 are a specific implementation of the step 304.

401: A first device sends a first monitoring request to a second device.

The first monitoring request is used to request the second device to monitor a service change event. The service change event includes a service registration event and/or a service deregistration event. The first device may request the second device to monitor only the service registration event, or monitor only the service deregistration event. Alternatively, the first device may request the second device to monitor the service registration event and the service deregistration event.

402: The second device monitors the service change event.

In this embodiment of this application, after receiving the first monitoring request, the second device monitors the service change event.

Optionally, the first monitoring request may carry an identifier of the service change event, to indicate the service change event that is requested to be monitored. For example, the first monitoring request may carry an identifier of the service registration event and an identifier of the service deregistration event, to request to monitor the service registration event and the service deregistration event. After receiving the first monitoring request, the second device monitors the service registration event and the service deregistration event. Alternatively, the first monitoring request may not carry the identifier of the service change event. This is not limited in this embodiment of this application.

Optionally, the first monitoring request may carry one or more of a type of terminal that needs to be monitored and an area that needs to be monitored. If the first monitoring request carries the type of terminal that needs to be monitored, the second device monitors only whether the service change event occurs on the terminal device of the type of terminal that needs to be monitored. If the first monitoring request carries the area that needs to be monitored, the second device monitors only whether the service change event occurs in the area that needs to be monitored. For example, if the type of terminal that needs to be monitored and that is carried in the first monitoring request is a vehicle, and if the area that needs to be monitored is the area 1, the second device may monitor only whether the service change event occurs on the vehicle in the area 1. Optionally, the type of terminal that needs to be monitored and the area that needs to be monitored may also be preset on the second device.

403: After monitoring the service change event, the second device reports first information of the service change event to the first device.

Specifically, when the second device is the home platform, the second device may receive a service registration request sent by the terminal device. The service registration request may carry an identifier of a registered terminal device and a registered service, and the service registration request may further carry an area in which the registered service is used. After the second device registers the service for the terminal device, the second device determines that the service registration event is monitored. After determining that the service registration event is monitored, the second device sends the first information of the service registration event to the first device. The second device may also receive a service deregistration request sent by the terminal device. The service deregistration request may carry an identifier of a deregistered terminal and a deregistered service, and the service deregistration request may further carry an area in which the deregistered service is used. After the second device deregisters the service for the terminal device, the second device determines that the service deregistration event is monitored. After determining that the service deregistration event is monitored, the second device sends first information of the service deregistration event to the first device.

When the second device is the terminal device, after the terminal device successfully registers with the service, the terminal device determines that the service registration event is monitored, and the terminal device sends the first information of the service registration event to the first device. After the terminal device successfully deregisters the service, the terminal device determines that the service deregistration event is monitored, and the terminal sends the first information of the service deregistration event to the first device.

The first information includes service change information. The service change information includes a changed service and an identifier of a first area, and the first area is an area in which the changed service is used. Optionally, the service change information may further carry an identifier of the monitored service change event, to indicate the monitored service change event.

For example, the second device receives a service registration request sent by the terminal device. The service registration request carries an identifier of a terminal device 1 that registers a service, a registered service 1, and an area in which the service 1 is used. After registering the service 1 for the terminal device 1, the second device determines that the service registration event is monitored. The second device sends first information of the service registration event to the first device. The first information carries the identifier of the service registration event, the registered service 1, and an identifier of the area in which the service 1 is used. The second device monitors the service deregistration event in a similar way. Details are not described herein again.

404: The first device determines, based on the changed service, a target service used in the first area.

405: The first device determines a quantity of terminals that have the target service.

In this embodiment of this application, after receiving the first information, the first device determines, based on the changed service in the first information, the target service used in the first area, and determines the quantity of terminals that have the target service.

406: The first device determines, based on the target service and the quantity of terminals, a PC5 communication resource required in the first area.

407: The first device updates, based on the PC5 communication resource required in the first area, a PC5 communication resource pool that corresponds to the first area and that is in the PC5 configuration parameter.

For example, the first device may record, based on first information received within a time period, service distribution statuses in a plurality of areas and a quantity of terminals that have each service. As shown in the following Table 1, the area 1 includes the service 1, and a quantity of terminal devices that have the service 1 is 1000. An area 2 includes a service 2, and a quantity of terminal devices that have the service 2 is 500. An area 3 includes a service 3, and a quantity of terminal devices that have the service 3 is 200.

TABLE 1

| Area | Service in an area | Quantity of terminal devices that have a corresponding service |
|---|---|---|
| Area 1 | Service 1 | 1000 |
| Area 2 | Service 2 | 500 |
| Area 3 | Service 3 | 200 |

If the first device receives first information reported by the second device, and the first information carries a registered service 4 and an identifier of the area 1, as shown in Table 2, the first device may determine that target services used in the area 1 include the service 1 and the service 4, the quantity of terminals that have the service 1 is 1000, and the quantity of terminals that have the service 4 is 1. The first device may determine, based on the services in the area 1 and the quantity of terminals corresponding to each service in the area 1, a PC5 communication resource required in the area 1. For example, because the service 1 and the service 4 are services that need to consume a relatively large quantity of PC5 communication resources, and the quantity of terminal devices that have the service 1 is relatively large, the area 1 needs a relatively large quantity of PC5 communication resources. Therefore, PC5 communication resources in a resource pool that corresponds to the area 1 and that is in the PC5 configuration parameter may be added based on the PC5 communication resources required in the area 1.

TABLE 2

| Area | Service in an area | Quantity of terminal devices that have a corresponding service |
|---|---|---|
| Area 1 | Service 1 | 1000 |
| Area 1 | Service 4 | 1 |
| Area 2 | Service 2 | 500 |
| Area 3 | Service 3 | 200 |

If the first device receives first information reported by the second device, and the first information carries the deregistered service 3 and an identifier of the area 3, as shown in Table 3, the first device may determine that a target service used in the area 3 includes the service 3, and a quantity of terminals that have the service 3 is 199. The first device may determine, based on the service in the area 3 and the quantity of terminals corresponding to each service in the area 3, a PC5 communication resource required in the area 3. For example, because the service 3 is a service that needs to consume a relatively small quantity of PC5 communication resources, and the quantity of terminal devices that have the service 3 is relatively small, the area 3 needs a relatively small quantity of PC5 communication resources. Therefore, PC5 communication resources in a resource pool that corresponds to the area 3 and that is in the PC5 configuration parameter may be reduced based on the PC5 communication resources required in the area 3.

TABLE 3

| Area | Service in an area | Quantity of terminal devices that have a corresponding service |
|---|---|---|
| Area 1 | Service 1 | 1000 |
| Area 1 | Service 4 | 1 |
| Area 2 | Service 2 | 500 |
| Area 3 | Service 3 | 199 |

As an optional implementation, the service change information further includes an identifier of a terminal of a changed service. A specific implementation of that the first device determines the quantity of terminals that have the target service includes: determining, based on the identifier of the terminal of the changed service, the quantity of terminals that have the target service. In this implementation, the first device does not need to directly record the quantity of terminal devices that have the corresponding service, as shown in Table 1 to Table 3. The first device may record an identifier of the terminal device that has the corresponding service, and further determine, based on the identifier of the terminal device, the quantity of terminal devices that have the corresponding service. Based on this implementation, the first device can accurately determine the quantity of terminals that have the target service.

As shown in Table 4, the first device may determine, based on an identifier of the terminal device that has the service 1, that the quantity of terminal devices that have the service 1 is 1000. The first device may determine, based on an identifier of the terminal device that has the service 2, that the quantity of terminal devices that have the service 2 is 500. The first device may determine, based on an identifier of the terminal device that has the service 3, that the quantity of terminal devices that have the service 3 is 200.

TABLE 4

| Area | Service in an area | Identifiers of terminal devices that have a corresponding service |
|---|---|---|
| Area 1 | Service 1 | Identifier of a terminal device 1 to an identifier of a terminal device 1000 |
| Area 2 | Service 2 | Identifier of a terminal device 1 to an identifier of a terminal device 500 |
| Area 3 | Service 3 | Identifier of a terminal device 1 to an identifier of a terminal device 200 |

If the first device receives first information reported by the second device, and the first information carries the registered service 4, the identifier of the area 1, and the identifier of the terminal device 1, the first device may record information shown in the following Table 5. Therefore, the first device may determine that target services used in the area 1 include the service 1 and the service 4, the quantity of terminals that have the service 1 is 1000, and the quantity of terminals that have the service 4 is 1. The first device determines, based on the services in the area 1 and the quantity of terminals corresponding to each service in the area 1, a PC5 communication resource required in the area 1. For example, because the service 1 and the service 4 are services that need to consume a relatively large quantity of PC5 communication resources, and the quantity of terminal devices that have the service 1 is relatively large, the area 1 needs a relatively large quantity of PC5 communication resources. Therefore, PC5 communication resources in a resource pool that corresponds to the area 1 and that is in the PC5 configuration parameter may be added based on the PC5 communication resources required in the area 1. The second device monitors the service deregistration event in a similar way. Details are not described herein again.

TABLE 5

| Area | Service in an area | Identifiers of terminal devices that have a corresponding service |
|---|---|---|
| Area 1 | Service 1 | Identifier of a terminal device 1 to an identifier of a terminal device 1000 |
| Area 1 | Service 4 | Identifier of a terminal device 1 |
| Area 2 | Service 2 | Identifier of a terminal device 1 to an identifier of a terminal device 500 |
| Area 3 | Service 3 | Identifier of a terminal device 1 to an identifier of a terminal device 200 |

Optionally, if the service registration event is monitored, the first device further needs to update, in the PC5 configuration parameter, one or more of a destination layer-2 address corresponding to the registered service, a privacy update time point corresponding to the registered service, spectrum information corresponding to the registered service, and the like.

Optionally, in addition to updating, based on the PC5 communication resource required in the first area, the PC5 communication resource pool that corresponds to the first area and that is in the PC5 configuration parameter, the first device may further update a PC5 communication resource pool that corresponds to an adjacent area of the first area. For a specific implementation principle, refer to the corresponding description in the 304 in the foregoing embodiment. Details are not described herein again.

It can be learned that by implementing the method described in FIG. 4, the first device can accurately determine the PC5 communication resource required in the first area, and the first device can properly update the PC5 configuration parameter in time based on the PC5 communication resource required in the first area.

Figure 5:
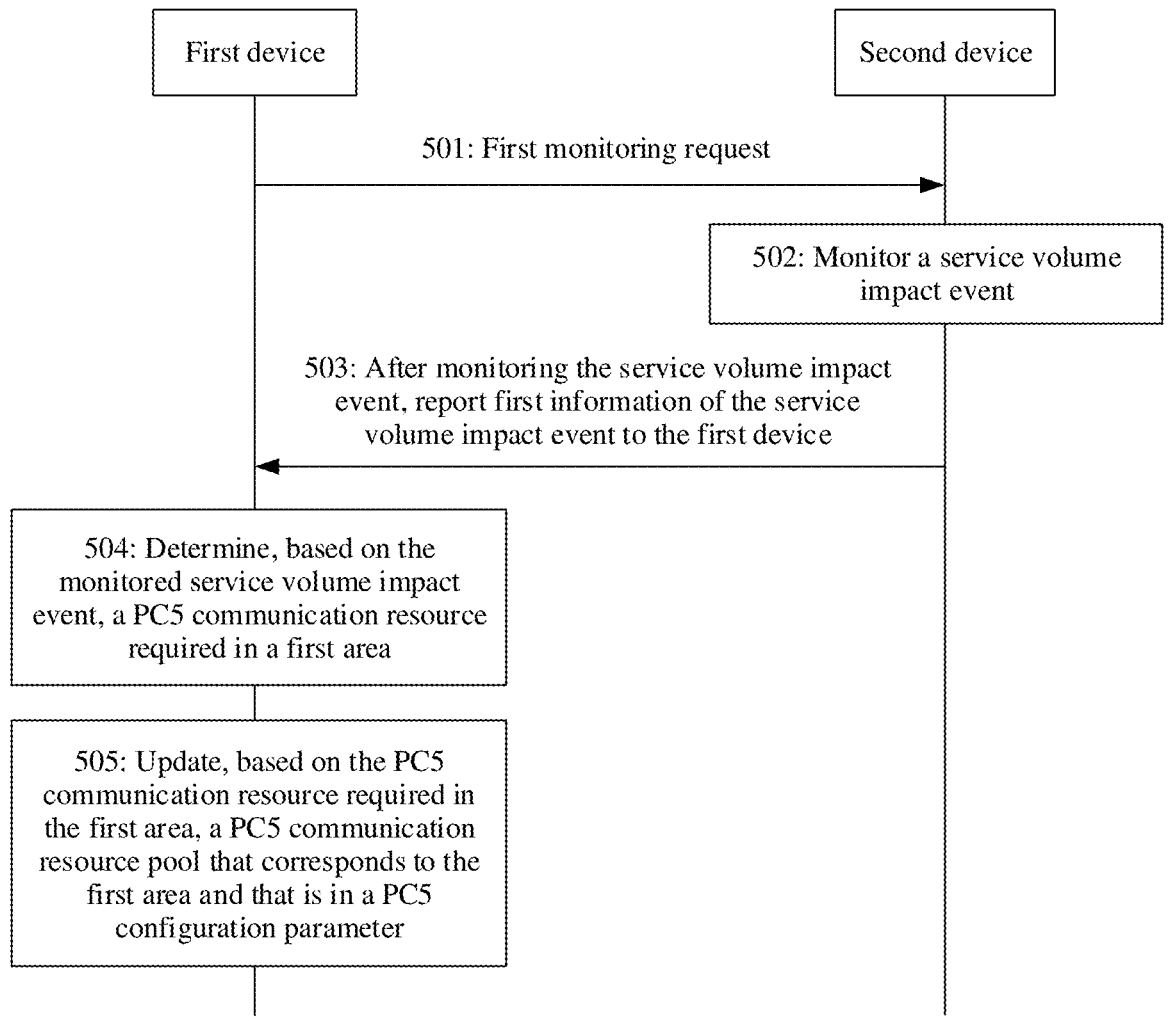

FIG. 5 is a schematic diagram of another configuration parameter update method according to at least one embodiment of this application. FIG. 5 shows an example in which a service volume impact event is monitored. In the method shown in FIG. 5, a second device may be a traffic management platform or another device that can monitor the service volume impact event. As shown in FIG. 5, the configuration parameter update method includes the following steps 501 to 505. Steps 505 and 505 are another specific implementation of the step 304.

501: A first device sends a first monitoring request to a second device.

The first monitoring request is used to request the second device to monitor the service volume impact event. The service volume impact event is an event in which a service volume is affected. The service volume is a quantity of messages that are sent through a PC5 in a unit time. For example, the event in which the service volume is affected may be a traffic control event and/or a road construction event.

502: The second device monitors the service volume impact event.

In this embodiment of this application, after receiving the first monitoring request, the second device monitors the service volume impact event.

Optionally, the first monitoring request may carry an identifier of the service volume impact event, to indicate the service volume impact event that is requested to be monitored. For example, the first monitoring request may carry an identifier of the traffic control event and an identifier of the road construction event, to request to monitor the traffic control event and the road construction event. After receiving the first monitoring request, the second device monitors the traffic control event and the road construction event. Alternatively, the first monitoring request may not carry the identifier of the service volume impact event. This is not limited in this embodiment of this application.

Optionally, the first monitoring request may further carry an area that needs to be monitored. In this way, the second device may monitor only whether the service volume impact event occurs in the area that needs to be monitored. For example, if the area that needs to be monitored is an area 1, the second device may monitor only whether the service volume impact event occurs in the area 1. Optionally, the area that needs to be monitored may also be preset on the second device.

503: After monitoring the service volume impact event, the second device reports first information of the service volume impact event to the first device.

The first information includes service volume impact information. The service volume impact information includes the monitored service volume impact event and an identifier of a first area, and the first area is an area affected by the service volume impact event. That the service volume impact information includes the monitored service volume impact event may be specifically the following: The service volume impact information may include an identifier of the monitored service volume impact event.

For example, the second device monitors the road construction event. The second device sends, to the first device, first information used to indicate that the road construction event is monitored. The first information carries an identifier of the road construction event and an identifier of the area 1 affected by the road construction event.

504: The first device determines, based on the monitored service volume impact event, a PC5 communication resource required in the first area.

505: The first device updates, based on the PC5 communication resource required in the first area, a PC5 communication resource pool that corresponds to the first area and that is in a PC5 configuration parameter.

For example, the second device monitors the road construction event, and the second device sends service volume impact information of the road construction event to the first device. The service volume impact information carries the identifier of the road construction event and the identifier of the area 1 affected by the road construction event. Because the road construction event affects vehicle traffic, a service volume in the area 1 is reduced. Therefore, a PC5 communication resource required in the area 1 is reduced. The first device may reduce, based on the PC5 communication resource required in the first area, a PC5 communication resource in the PC5 communication resource pool that corresponds to the first area and that is in the PC5 configuration parameter.

Optionally, in addition to updating, based on the PC5 communication resource required in the first area, the PC5 communication resource pool that corresponds to the first area and that is in the PC5 configuration parameter, the first device may further update a PC5 communication resource pool that corresponds to an adjacent area of the first area. For a specific implementation principle, refer to the corresponding description in the 304 in the foregoing embodiment. Details are not described herein again.

As an optional implementation, the service volume impact information further includes a first time period, and the first time period is a time period the service volume impact event lasts. After that the first device updates, based on the PC5 communication resource required in the first area, the PC5 communication resource pool that corresponds to the first area and that is in the PC5 configuration parameter, the first device restores, based on the first time period, the PC5 communication resource pool corresponding to the first area to a resource pool used before the updating. Based on this implementation, the first device can properly restore the PC5 configuration parameter in time.

For example, the first device receives first information. The first information carries the identifier of the road construction event, the identifier of the area 1 affected by the road construction event, and the first time period from 8:00 to 9:00. After receiving the first information, the first device determines, based on the road construction event, a PC5 communication resource required in the first area, and updates, based on the PC5 communication resource required in the first area, a PC5 communication resource pool 1 corresponding to the area 1, to obtain a PC5 communication resource pool 2. A PC5 communication resource in the PC5 communication resource pool 2 is less than a PC5 communication resource in the PC5 communication resource pool 1. After 9:00, in other words, after the first time period ends, the first device restores the PC5 communication resource pool corresponding to the area 1 to the PC5 communication resource pool 1.

It can be learned that by implementing the method described in FIG. 5, the first device can accurately determine the PC5 communication resource required in the first area, and the first device can properly update the PC5 configuration parameter in time based on the PC5 communication resource required in the first area.

Figure 6:
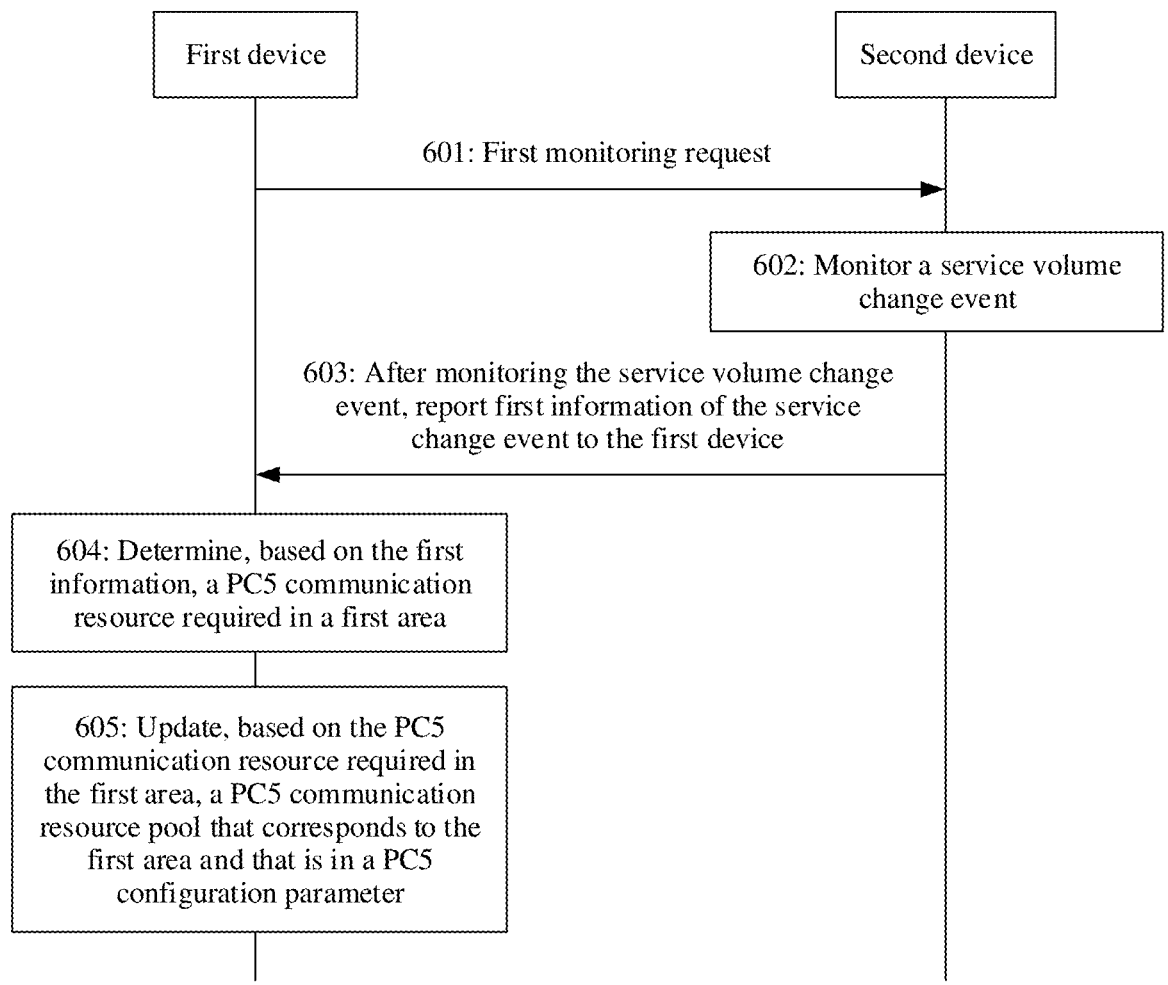

FIG. 6 is a schematic diagram of another configuration parameter update method according to at least one embodiment of this application. FIG. 6 shows an example in which a service volume change event is monitored. In the method shown in FIG. 6, the second device may be another device that can monitor a service volume, such as a home platform or a roadside unit. As shown in FIG. 6, the configuration parameter update method includes the following steps 601 to 605. Steps 604 and 605 are a specific implementation of the step 304.

601: A first device sends a first monitoring request to a second device.

The first monitoring request is used to request the second device to monitor a service change event. The service volume change event is an event in which the service volume is greater than a first threshold or the service volume is less than a second threshold. The first threshold is greater than the second threshold. Therefore, the service volume change event may include a service volume overload event and/or a service volume release event. The service volume overload event is an event in which the service volume is greater than the first threshold, and the service volume release event is an event in which the service volume is less than the second threshold.

602: The second device monitors the service volume change event.

In this embodiment of this application, after receiving the first monitoring request, the second device monitors the service change event.

Optionally, the first monitoring request may carry an identifier of the service change event, to indicate the service change event that is requested to be monitored. For example, the first monitoring request may carry an identifier of a service volume overload event and an identifier of a service volume release event, to request to monitor the service volume overload event and the service volume release event. After receiving the first monitoring request, the second device monitors the service volume overload event and the service volume release event. Alternatively, the first monitoring request may not carry the identifier of the service volume change event. This is not limited in this embodiment of this application.

Optionally, the first monitoring request may further carry one or more of an area that needs to be monitored, the first threshold, the second threshold, a type of terminal that needs to be monitored, a service volume statistics period, and a reporting condition of first information. Optionally, the reporting condition of the first information may be that the service volume overload event is detected for a preset quantity of consecutive times or the service volume release event is detected for a preset quantity of consecutive times. Alternatively, the reporting condition of the first information may be that the service volume overload event is detected for a preset quantity of times within a preset time period, or the service volume release event is detected for a preset quantity of times within a preset time period.

For example, the first monitoring request carries the type of terminal that needs to be monitored, the area that needs to be monitored, the first threshold, the second threshold, the service volume statistics period, and the reporting condition of the first information. The type of terminal that needs to be monitored is a vehicle, the area that needs to be monitored is an area 1, the service volume statistics period is 10 minutes, and the reporting condition of the first information is that the service volume overload event is detected for three consecutive times or the service volume release event is detected for three consecutive times. After the second device receives the first monitoring request, the second device collects statistics on a service volume of a vehicle in the area 1 at an interval of 10 minutes, and reports the first information to the first device when the second device detects the service volume overload event for three consecutive times or detects the service volume release event for three consecutive times.

603: After monitoring the service volume change event, the second device reports first information of the service change event to the first device.

The first information includes service volume change information. The service volume change information includes a changed service volume and an identifier of a first area. The first area is an area in which the service volume is changed. Optionally, the service volume change information may further include an identifier of the monitored service volume change event, to indicate the monitored service volume change event.

For example, the second device monitors the service volume overload event. The second device sends, to the first device, first information used to indicate that the service volume overload event is monitored. The first information carries the identifier of the service volume overload event, the changed service volume, and an identifier of the area 1 in which the service volume is changed.

604: The first device determines, based on the first information, a PC5 communication resource required in the first area.

605: The first device updates, based on the PC5 communication resource required in the first area, a PC5 communication resource pool that corresponds to the first area and that is in a PC5 configuration parameter.

For example, the second device monitors the service volume overload event, and the second device sends the first information of the service volume overload event to the first device. The first information carries the changed service volume and the identifier of the area 1 in which the service volume is changed. Because the changed service volume is large, a PC5 communication resource required in the area 1 is added. The first device may determine, based on the changed service volume, the PC5 communication resource required in the area 1, and then add, based on the PC5 communication resource required in the first area, a PC5 communication resource in the PC5 communication resource pool that corresponds to the first area and that is in the PC5 configuration parameter. Likewise, if the second device monitors the service volume release event, the second device sends first information of the service volume release event to the first device. The first information carries a changed service volume and an identifier of the area 1 in which the service volume is changed. Because the changed service volume is small, the PC5 communication resource required in the area 1 is reduced. The first device may determine, based on the changed service volume, the PC5 communication resource required in the area 1, and then reduce, based on the PC5 communication resource required in the first area, a PC5 communication resource in the PC5 communication resource pool that corresponds to the first area and that is in the PC5 configuration parameter.

Optionally, in addition to updating, based on the PC5 communication resource required in the first area, the PC5 communication resource pool that corresponds to the first area and that is in the PC5 configuration parameter, the first device may further update a PC5 communication resource pool that corresponds to an adjacent area of the first area. For a specific implementation principle, refer to the corresponding description in the 304 in the foregoing embodiment. Details are not described herein again.

Optionally, the first information further includes one or more of a type of a target terminal and a size of a message sent by the target terminal through PC5. The target terminal is a terminal that performs communication in the first area through the PC5. Based on this implementation, the first device can more accurately determine, based on more parameters, the PC5 communication resource required in the first area.

For example, if the first information further includes the type of target terminal, the first device may determine, based on the changed service volume and the type of target terminal, the PC5 communication resource required in the first area. Different types of terminal devices require different PC5 communication resources. Therefore, the PC5 communication resource required in the first area may be determined based on the changed service volume and the type of target terminal.

For another example, if the first information further includes the size of the message sent by the target terminal through the PC5, the first device may determine, based on the changed service volume and the size of the message sent by the target terminal through the PC5, the PC5 communication resource required in the first area. Different sizes of messages require different PC5 communication resources. A larger message requires more PC5 communication resources. Therefore, the PC5 communication resource required in the first area may be determined based on the changed service volume and the size of the message sent by the target terminal through the PC5.

For another example, if the first information further includes the type of target terminal and the size of the message sent by the target terminal through the PC5, the first device may determine, based on the type of target terminal, the changed service volume, and the size of the message sent by the target terminal through the PC5, the PC5 communication resource required in the first area.

It can be learned that by implementing the method described in FIG. 6, the first device can accurately determine the PC5 communication resource required in the first area, and the first device can properly update the PC5 configuration parameter in time based on the PC5 communication resource required in the first area.

Figure 7:
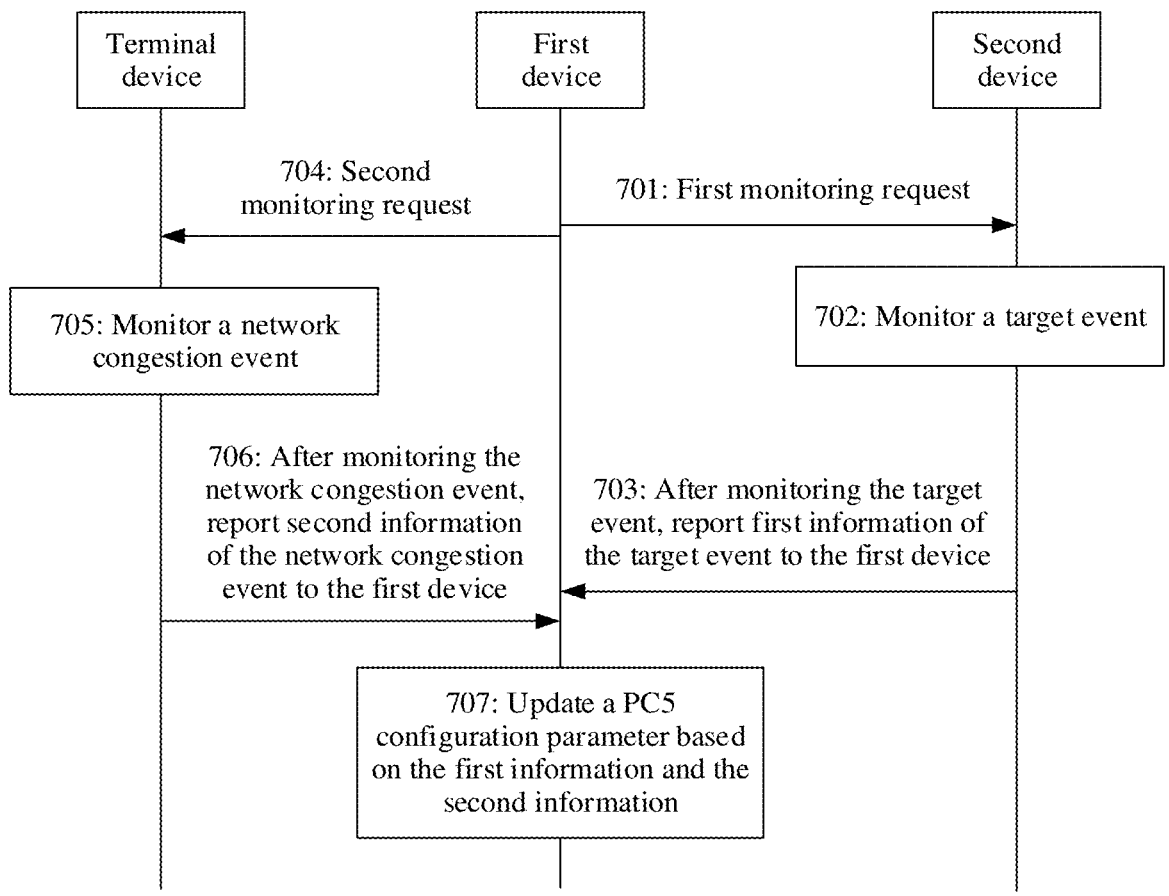

FIG. 7 is a schematic diagram of another configuration parameter update method according to at least one embodiment of this application. As shown in FIG. 7, the configuration parameter update method includes the following steps 701 to 707. The step 707 is another specific implementation of the step 304.

701: A first device sends a first monitoring request to a second device.

702: The second device monitors a target event.

703: After monitoring the target event, the second device reports first information of the target event to the first device.

Specific implementations of the steps 701 to 703 are the same as the specific implementations of the steps 301 to 303. Details are not described herein again.

704: The first device sends a second monitoring request to a terminal device.

The second monitoring request is used to request the terminal device to monitor a network congestion event.

705: The terminal device monitors the network congestion event.

In this embodiment of this application, after receiving the second monitoring request, the terminal device monitors the network congestion event.

Optionally, if detecting that a network parameter does not meet a preset condition, the terminal device determines that the network congestion event is monitored. For example, the network parameter may be a signal receiving success rate. If the signal receiving success rate is less than a preset threshold, the terminal device determines that the network congestion event is monitored. For another example, the network parameter may be a communication delay. If the communication delay is greater than a preset delay, the terminal device determines that the network congestion event is monitored. For another example, the network parameter may be a throughput. If the throughput is less than a preset throughput, the terminal device determines that the network congestion event is monitored.

Optionally, the second monitoring request further carries one or more of an area that needs to be monitored, a network parameter that needs to be monitored, and a reporting condition of second information. If the second monitoring request further carries the area that needs to be monitored, the terminal device monitors only whether the network congestion event occurs in the area that needs to be monitored. If the second monitoring request further carries the network parameter that needs to be monitored, the terminal device monitors the network parameter that needs to be monitored, and determines, based on the monitored network parameter, whether the network congestion event occurs. If the second monitoring request further carries the reporting condition of the second information, after detecting the network congestion event, the terminal device reports the second information to the first device if the reporting condition of the second information is met. Optionally, the reporting condition of the second information may be that the network congestion event is detected for a preset quantity of consecutive times. Alternatively, the reporting condition of the second information may be that the network congestion event is detected for a preset quantity of times within a preset time period. Based on this implementation, the first device can specify, for the terminal device, the area that needs to be monitored, the network parameter that needs to be monitored, and the reporting condition of the second information.

For example, the area that needs to be monitored and that is carried by the second monitoring request is an area 1, the network parameter that needs to be monitored is a communication delay, and the reporting condition of the second information is that the network congestion event is detected for three consecutive times. The terminal device monitors the communication delay in the area 1, and if the communication delay is greater than the preset delay, determines that the network congestion event is monitored. If the network congestion event is detected for three consecutive times, the terminal device reports the second information to the first device.

706: After monitoring the network congestion event, the terminal device reports the second information of the network congestion event to the first device.

707: The first device updates a PC5 configuration parameter based on the first information and the second information.

In this embodiment of this application, after receiving the first information reported by the second device and the second information reported by the terminal device, the first device updates the PC5 configuration parameter based on the first information and the second information. Specifically, the first device determines, based on the first information and the second information, a PC5 communication resource required in an area, and then updates, based on the PC5 communication resource required in the area, a PC5 communication resource in a PC5 communication resource pool that corresponds to the area and that is in the PC5 configuration parameter. Optionally, in addition to updating, based on the PC5 communication resource required in the area, the PC5 communication resource pool that corresponds to the area and that is in the PC5 configuration parameter, the first device may further update a PC5 communication resource pool that corresponds to an adjacent area of the area.

The second information includes a network parameter of the terminal device and current location information of the terminal device. The current location information of the terminal device may be a current area in which the terminal device is located, or current location coordinates of the terminal device. For detailed descriptions of the first information, refer to the corresponding descriptions in the foregoing method embodiments. Details are not described herein again.

For example, the first device receives first information reported by the second device. The first information includes a registered service 1 and an identifier of an area 1 in which the service 1 is used. The first device receives second information reported by the terminal device. The second information includes a communication delay and the area 1 in which the terminal device is currently located. The first device determines, based on the first information and the second information, a PC5 communication resource required in the area 1. For example, if a service in the area 1 requires a relatively large quantity of PC5 communication resources, a quantity of terminals that have the service in the area 1 is relatively large, and a communication delay is relatively low, the first device may determine that the area 1 requires a relatively large quantity of PC5 communication resources. The first device updates, based on the PC5 communication resource required in the area 1, a PC5 communication resource pool that corresponds to the area 1 and that is in the PC5 configuration parameter.

Optionally, the second information may further include a type of terminal device. The first device may determine, based on the first information and the network parameter of the terminal device and the type of terminal device that are in the second information, the PC5 communication resource required in the area, and update, based on the PC5 communication resource required in the area, the PC5 communication resource in the PC5 communication resource pool that corresponds to the area and that is in the PC5 configuration parameter. Different types of terminal devices require different PC5 communication resources. Therefore, the PC5 communication resource required in the area may be determined based on the type of terminal device.

It should be noted that the first device may enable a plurality of different second devices to monitor different events, determine, based on first information uploaded by the plurality of different second devices and second information uploaded by the terminal device, a PC5 communication resource required in an area, and further update, based on the PC5 communication resource required in the area, a PC5 communication resource pool that corresponds to the area and that is in the PC5 configuration parameter. For example, the first device sends a first monitoring request 1 to a home platform, where the first monitoring request 1 requests to monitor a service change event. The first device sends a first monitoring request 2 to a traffic management platform, where the first monitoring request 2 requests to monitor a service volume impact event. The first device sends a first monitoring request 3 to a roadside unit, where the first monitoring request 3 requests to monitor a service volume change event. The first device receives the first information 1 sent by the home platform, where the first information 1 includes service change information. The first device receives the first information 2 sent by the traffic management platform, where the first information 2 includes service volume impact information. The first device receives the first information 3 sent by the home platform, where the first information 3 includes service volume change information. The first device sends a second monitoring request to a terminal device, where the second monitoring request is used to request to monitor a network congestion event. The first device receives second information reported by the terminal device. The first device determines, based on the service change information, the service volume impact information, the service volume change information, and the second information, a PC5 communication resource required in an area, and further updates, based on the PC5 communication resource required in the area, a PC5 communication resource pool that corresponds to the area and that is in the PC5 configuration parameter.

It can be learned that by implementing the method described in FIG. 7, the first device can properly update the PC5 configuration parameter in time.

The foregoing describes in detail the configuration parameter update method according to some embodiments of this application. The following describes a related apparatus in some embodiments of this application.

In some embodiments of the instant application, the device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in this embodiment of the instant application, module division is exemplary, and is merely a logical function division. In actual implementation, another division manner may be used.

Figure 8:
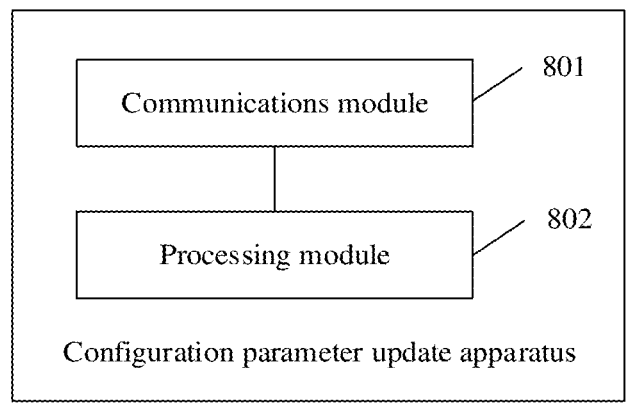
FIG. 8 and FIG. 9 are schematic structural diagrams of various configuration parameter update apparatuses according to at least one embodiment of this application.

FIG. 8 is a schematic structural diagram of a configuration parameter update apparatus according to at least one embodiment of this application. The configuration parameter update apparatus in this embodiment of this application may be applied to the first device in the foregoing method embodiment. The configuration parameter update apparatus may be configured to perform some or all functions of the first device in the foregoing method embodiments. The configuration parameter update apparatus may include a communications module 801 and a processing module 802. The details are as follows:

The communications module 801 is configured to send a first monitoring request to a second device. The first monitoring request is used to request the second device to monitor a target event, and the target event includes one or more of a service change event, a service volume impact event, and a service volume change event. The service volume change event is an event in which a service volume is greater than a first threshold or a service volume is less than a second threshold, and the first threshold is greater than the second threshold. The communications module 801 is further configured to receive first information that is of the target event and that is reported by the second device. The first information includes one or more of service change information, service volume impact information, and service volume change information. The processing module 802 is configured to update a PC5 configuration parameter based on the first information.

In an optional implementation, the first information includes the service change information, the service change information includes a changed service and an identifier of a first area, and the first area is an area in which the changed service is used. A manner in which the processing module 802 updates the PC5 configuration parameter based on the first information specifically includes: determining, based on the changed service, a target service used in the first area; determining a quantity of terminals that have the target service; determining, based on the target service and the quantity of terminals, a proximity communication PC5 communication resource required in the first area; and updating, based on the PC5 communication resource required in the first area, a PC5 communication resource pool that corresponds to the first area and that is in the PC5 configuration parameter.

As an optional implementation, the service change information further includes an identifier of a terminal of the changed service. A manner in which the processing module 802 determines the quantity of terminals that have the target service specifically includes: determining, based on the identifier of the terminal of the changed service, the quantity of terminals that have the target service.

In an optional implementation, the first information includes the service volume impact information, the service volume impact information includes a monitored service volume impact event and an identifier of a first area, and the first area is an area affected by the service volume impact event. A manner in which the processing module 802 updates the PC5 configuration parameter based on the first information specifically includes: determining, based on the monitored service volume impact event, a proximity communication PC5 communication resource required in the first area; and updating, based on the PC5 communication resource required in the first area, a PC5 communication resource pool that corresponds to the first area and that is in the PC5 configuration parameter.

As an optional implementation, the service volume impact information further includes a first time period, and the first time period is a time period the service volume impact event lasts. The processing module 802 is further configured to: after updating, based on the PC5 communication resource required in the first area, the PC5 communication resource pool that corresponds to the first area and that is in the PC5 configuration parameter, restore, based on the first time period, the PC5 communication resource pool that corresponds to the first area to a resource pool used before the updating.

In an optional implementation, the first information includes the service volume change information, the service volume change information includes a changed service volume and an identifier of a first area, and the first area is an area in which a service volume is changed. A manner in which the processing module 802 updates the PC5 configuration parameter based on the first information specifically includes: determining, based on the first information, a proximity communication PC5 communication resource required in the first area; and updating, based on the PC5 communication resource required in the first area, a PC5 communication resource pool that corresponds to the first area and that is in the PC5 configuration parameter.

In an optional implementation, the first information further includes one or more of a type of a target terminal and a size of a message sent by the target terminal through PC5, and the target terminal is a terminal that performs communication in the first area through the PC5.

In an optional implementation, the first device sends a second monitoring request to a terminal device, where the second monitoring request is used to request the terminal device to monitor a network congestion event. The first device receives second information that is of the network congestion event and that is reported by the terminal device, where the second information includes a network parameter of the terminal device and current location information of the terminal device. A manner in which the processing module 802 updates the PC5 configuration parameter based on the first information specifically includes: updating, by the first device, the PC5 configuration parameter based on the first information and the second information.

In an optional implementation, the second information further includes a type of terminal device.

In an optional implementation, the second monitoring request carries one or more of an area that needs to be monitored, a network parameter that needs to be monitored, and a reporting condition of the second information.

In an optional implementation, the first monitoring request further carry one or more of a type of terminal that needs to be monitored, an area that needs to be monitored, the first threshold, the second threshold, a service volume statistics period, and a reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform.

Based on a same inventive concept, for a problem-resolving principle and beneficial effects of the configuration parameter update apparatus, refer to the implementations of the foregoing method embodiments. Details are not described herein.

FIG. 8 is a schematic structural diagram of a configuration parameter update apparatus according to at least one embodiment of this application. The configuration parameter update apparatus in this embodiment of this application may be applied to the second device in the foregoing method embodiment. The configuration parameter update apparatus may be configured to perform some or all functions of the second device in the foregoing method embodiments. The configuration parameter update apparatus may include a communications module 801 and a processing module 802. The details are as follows:

The communications module 801 is configured to receive a first monitoring request sent by a first device. The first monitoring request is used to request the second device to monitor a target event, and the target event includes one or more of a service change event, a service volume impact event, or a service volume change event. The service volume change event is an event in which a service volume is greater than a first threshold or a service volume is less than a second threshold, and the first threshold is greater than the second threshold. The processing module 802 is configured to monitor the target event. The communications module 801 is further configured to: after the processing module 802 monitors the target event, report first information of the target event to the first device. The first information includes one or more of service change information, service volume impact information, or service volume change information.

In an optional implementation, the first information includes the service change information, the service change information includes a changed service and an identifier of a first area, and the first area is an area in which the changed service is used.

As an optional implementation, the service change information further includes an identifier of a terminal of the changed service.

In an optional implementation, the first information includes the service volume impact information, the service volume impact information includes a monitored service volume impact event and an identifier of a first area, and the first area is an area affected by the service volume impact event.

In an optional implementation, the service volume impact information further includes a first time period, and the first time period is a time period the service volume impact event lasts.

In an optional implementation, the first information includes the service volume change information, the service volume change information includes a changed service volume and an identifier of a first area, and the first area is an area in which a service volume is changed.

In an optional implementation, the first information further includes one or more of a type of a target terminal and a size of a message sent by the target terminal through PC5, and the target terminal is a terminal that performs communication in the first area through the PC5.

In an optional implementation, the communications module 801 is further configured to receive a second monitoring request sent by the first device, where the second monitoring request is used to request the second device to monitor a network congestion event. The processing module 802 is further configured to monitor the network congestion event. The communications module 801 is further configured to: after the processing module 802 monitors the network congestion event, report second information of the network congestion event to the first device, where the second information includes a network parameter of the second device and current location information of the second device.

In an optional implementation, the second information further includes a type of terminal device.

In an optional implementation, the second monitoring request carries one or more of an area that needs to be monitored, a network parameter that needs to be monitored, and a reporting condition of the second information.

In an optional implementation, the first monitoring request further carry one or more of a type of terminal that needs to be monitored, an area that needs to be monitored, the first threshold, the second threshold, a service volume statistics period, and a reporting condition of the first information.

In an optional implementation, the first device is one of a vehicle-to-everything application server V2X AS, a vehicle-to-everything service control function device V2X CF, and an access network device, and the second device is one of the terminal device, a home platform of the terminal device, and a traffic management platform.

Based on a same inventive concept, for a problem-resolving principle and beneficial effects of the configuration parameter update apparatus, refer to the implementations of the foregoing method embodiments. Details are not described herein.

Figure 9:
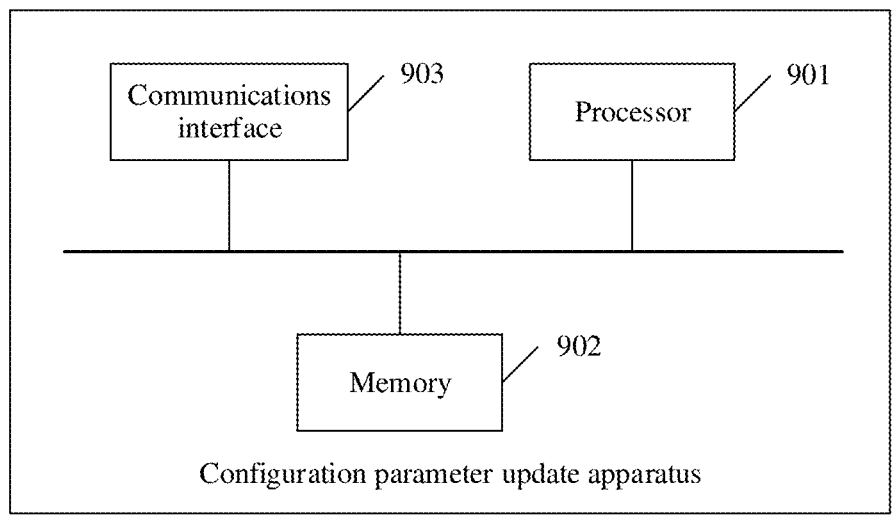

FIG. 9 is a schematic structural diagram of a configuration parameter update apparatus according to at least one embodiment of this application. The configuration parameter update apparatus may perform behavior functions of the first device or the second device in the foregoing method embodiments. As shown in FIG. 9, the configuration parameter update apparatus includes a processor 901, a memory 902, and a communications interface 903. The processor 901, the memory 902, and the communications interface 903 are connected.

The processor 901 may be a central processing unit (CPU), a general-purpose processor, a co-processor, a digital signal processor (DSP), an application-specific integrated circuit (ASIC), a field programmable gate array (FPGA), or another programmable logical device, a transistor logical device, a hardware component, or any combination thereof. Alternatively, the processor 901 may be a combination of processors implementing a computing function, for example, a combination of one or more microprocessors, or a combination of the DSP and a microprocessor.

The communications interface 903 is configured to implement communication with another network element.

The processor 901 invokes program code stored in the memory 902, to perform the steps performed by the first device or the second device in the foregoing method embodiments.

Based on a same inventive concept, for a problem-resolving principle and beneficial effects of the configuration parameter update apparatus, refer to the implementations of the foregoing method embodiments. Details are not described herein.

It should be noted that, in the foregoing embodiments, the description of each embodiment has respective focuses. For a part that is not described in detail in an embodiment, refer to related descriptions in other embodiments.

A sequence of the steps of the methods in some embodiments of the instant application may be adjusted, and the steps may also be combined or removed according to an actual requirement.

In some embodiments of the instant application, modules in the terminal device and the access network device may be combined, divided, or deleted according to an actual requirement.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A configuration parameter update method, comprising:
sending, by a first device, a first monitoring request to a second device, to request the second device to monitor a target event, wherein
the target event comprises one or more of a service change event, a service volume impact event, and a service volume change event,
the service volume change event is an event in which a service volume is greater than a first threshold or less than a second threshold, and
the first threshold is greater than the second threshold;
receiving, by the first device, first information of the target event from the second device, wherein
in response to the target event comprising the service change event, the first information comprises service change information,
in response to the target event comprising the service volume impact event, the first information comprises service volume impact information, and
in response to the target event comprising the service volume change event, the first information comprises service volume change information; and
updating, by the first device, a proximity communication (PC5) configuration parameter based on the first information to enable a plurality of terminals to perform communication with each other over PC5 using the updated PC5 configuration parameter.

2. The method according to claim 1, wherein
the first information comprises the service change information,
the service change information comprises a changed service and an identifier of a first area,
the first area is an area in which the changed service is used, and
the updating, by the first device, the PC5 configuration parameter based on the first information comprises:
determining, based on the changed service, a target service used in the first area;
determining a quantity of terminals that have the target service;
determining, based on the target service and the quantity of terminals, a PC5 communication resource required in the first area; and
updating, based on the PC5 communication resource required in the first area, a PC5 communication resource pool that corresponds to the first area and that is in the PC5 configuration parameter.

3. The method according to claim 2, wherein
the service change information further comprises an identifier of a terminal of the changed service, and
the determining the quantity of terminals that have the target service comprises:
determining, based on the identifier of the terminal of the changed service, the quantity of terminals that have the target service.

4. The method according to claim 1, wherein
the first information comprises the service volume impact information,
the service volume impact information comprises a monitored service volume impact event and an identifier of a first area,
the first area is an area affected by the monitored service volume impact event, and
the updating, by the first device, the PC5 configuration parameter based on the first information comprises:
determining, based on the monitored service volume impact event, a PC5 communication resource required in the first area; and
updating, based on the PC5 communication resource required in the first area, a PC5 communication resource pool that corresponds to the first area and that is in the PC5 configuration parameter.

5. The method according to claim 4, wherein
the service volume impact information further comprises a first time period,
the first time period is a time period the monitored service volume impact event lasts, and
after the updating, based on the PC5 communication resource required in the first area, the PC5 communication resource pool that corresponds to the first area and that is in the PC5 configuration parameter, the method further comprises:

restoring, based on the first time period, the PC5 communication resource pool corresponding to the first area to a PC5 communication resource pool used before the updating.

6. The method according to claim 1, wherein
the first information comprises the service volume change information,
the service volume change information comprises a changed service volume and an identifier of a first area,
the first area is an area in which a service volume is changed, and
the updating, by the first device, the PC5 configuration parameter based on the first information comprises:
determining, based on the first information, a PC5 communication resource required in the first area; and
updating, based on the PC5 communication resource required in the first area, a PC5 communication resource pool that corresponds to the first area and that is in the PC5 configuration parameter.

7. The method according to claim 6, wherein
the first information further comprises one or more of a type of a target terminal and a size of a message sent by the target terminal through PC5, and
the target terminal is a terminal that performs communication in the first area through the PC5.

8. The method according to claim 1, wherein
the method further comprises:
sending, by the first device, a second monitoring request to a terminal to request the terminal to monitor a network congestion event; and
receiving, by the first device, second information of the network congestion event from the terminal, wherein the second information comprises a network parameter of the terminal and current location information of the terminal, and
the updating, by the first device, the PC5 configuration parameter based on the first information comprises:
updating, by the first device, the PC5 configuration parameter based on the first information and the second information.

9. A configuration parameter update method, comprising:
receiving, by a second device, a first monitoring request sent by a first device, wherein
the first monitoring request requests the second device to monitor a target event,
the target event comprises one or more of a service change event, a service volume impact event, and a service volume change event,
the service volume change event is an event in which a service volume is greater than a first threshold or less than a second threshold, and
the first threshold is greater than the second threshold;
monitoring, by the second device and in response to the first monitoring request, the target event; and
after monitoring the target event, reporting, by the second device, first information of the target event to the first device to enable the first device to update a proximity communication (PC5) configuration parameter based on the first information, and to enable a plurality of terminals to perform communication with each other over PC5 using the updated PC5 configuration parameter,
wherein
in response to the target event comprising the service change event, the first information comprises service change information,
in response to the target event comprising the service volume impact event, the first information comprises service volume impact information, and
in response to the target event comprising the service volume change event, the first information comprises service volume change information.

10. The method according to claim 9, wherein
the first information comprises the service change information,
the service change information comprises a changed service and an identifier of a first area, and
the first area is an area in which the changed service is used.

11. The method according to claim 10, wherein
the service change information further comprises an identifier of a terminal of the changed service.

12. The method according to claim 9, wherein
the first information comprises the service volume impact information,
the service volume impact information comprises a monitored service volume impact event and an identifier of a first area, and
the first area is an area affected by the monitored service volume impact event.

13. The method according to claim 12, wherein
the service volume impact information further comprises a first time period, and
the first time period is a time period the monitored service volume impact event lasts.

14. The method according to claim 9, wherein
the first information comprises the service volume change information,
the service volume change information comprises a changed service volume and an identifier of a first area, and
the first area is an area in which a service volume is changed.

15. The method according to claim 14, wherein
the first information further comprises one or more of a type of a target terminal and a size of a message sent by the target terminal through PC5, and
the target terminal is a terminal that performs communication in the first area through the PC5.

16. The method according to claim 9, wherein the method further comprises:
receiving, by the second device, a second monitoring request sent by the first device, wherein the second monitoring request requests the second device to monitor a network congestion event;
monitoring, by the second device and in response to the second monitoring request, the network congestion event; and
after monitoring the network congestion event, reporting, by the second device, second information of the network congestion event to the first device to enable the first device to update the PC5 configuration parameter based on the first information and second information,
wherein the second information comprises a network parameter of the second device and current location information of the second device.

17. A configuration parameter update apparatus, comprising:
a transceiver; and
one or more processors connected to the transceiver, and configured to:

cause the transceiver to send, a first monitoring request to a second device to request the second device to monitor a target event, wherein
  the target event comprises one or more of a service change event, a service volume impact event, and a service volume change event,
  the service volume change event is an event in which a service volume is greater than a first threshold or less than a second threshold, and
  the first threshold is greater than the second threshold; and
in response to receiving, through the transceiver, first information of the target event from the second device,
  update a proximity communication (PC5) configuration parameter based on the first information to enable a plurality of terminals to perform communication with each other over PC5 using the updated PC5 configuration parameter,
wherein
  in response to the target event comprising the service change event, the first information comprises service change information,
  in response to the target event comprising the service volume impact event, the first information comprises service volume impact information, and
  in response to the target event comprising the service volume change event, the first information comprises service volume change information.

18. The configuration parameter update apparatus according to claim 17, wherein
  the first information comprises the service change information,
  the service change information comprises a changed service and an identifier of a first area,
  the first area is an area in which the changed service is used, and
  the one or more processors are further configured to
    determine, based on the changed service, a target service used in the first area,
    determine a quantity of terminals that have the target service,
    determine, based on the target service and the quantity of terminals, a PC5 communication resource required in the first area, and
    update, based on the PC5 communication resource required in the first area, a PC5 communication resource pool that corresponds to the first area and that is in the PC5 configuration parameter.

19. The configuration parameter update apparatus according to claim 18, wherein
  the service change information further comprises an identifier of a terminal of the changed service, and
  the one or more processors are further configured to
    determine, based on the identifier of the terminal of the changed service, the quantity of terminals that have the target service.

20. The configuration parameter update apparatus according to claim 17, wherein
  the first information comprises the service volume impact information,
  the service volume impact information comprises a monitored service volume impact event and an identifier of a first area,
  the first area is an area affected by the monitored service volume impact event, and
  the one or more processors are further configured to
    determine, based on the monitored service volume impact event, a PC5 communication resource required in the first area, and
    update, based on the PC5 communication resource required in the first area, a PC5 communication resource pool that corresponds to the first area and that is in the PC5 configuration parameter.

* * * * *